(12) United States Patent
Grzeslo et al.

(10) Patent No.: US 6,453,721 B1
(45) Date of Patent: Sep. 24, 2002

(54) GAS METER CALIBRATION TESTING DEVICE

(75) Inventors: Richard I. Grzeslo, Etobicoke; Andrew Smich, Mississauga, both of (CA)

(73) Assignee: Romet Limited, Mississauga (CA)

( * ) Notice: Subject to any disclaimer, the term of this patent is extended or adjusted under 35 U.S.C. 154(b) by 0 days.

(21) Appl. No.: 09/695,388

(22) Filed: Oct. 25, 2000

Related U.S. Application Data

(63) Continuation of application No. PCT/CA99/00480, filed on May 26, 1998.

(51) Int. Cl.⁷ .............................................. G01F 25/00
(52) U.S. Cl. ........................................ 73/1.16; 73/1.01
(58) Field of Search ............................... 62/5; 73/1.16, 73/1.25, 1.26

(56) References Cited

U.S. PATENT DOCUMENTS

| | | | |
|---|---|---|---|
| 1,952,281 A | 3/1934 | Ranque | 62/170 |
| 2,656,896 A * | 10/1953 | Glasgow | |
| 3,173,273 A | 3/1965 | Fulton | 62/5 |
| 3,208,229 A | 9/1965 | Fulton | 62/5 |
| 3,699,800 A | 10/1972 | Waldron | |
| 3,884,073 A | 5/1975 | Siebold | |
| 3,898,561 A | 8/1975 | Leighton | |
| 3,969,939 A | 7/1976 | Grzeslo | 73/194 |
| 4,026,120 A * | 5/1977 | Tallant | 62/5 |
| 4,448,757 A * | 5/1984 | Barnwell et al. | 423/247 |
| 5,267,467 A | 12/1993 | Caron | |

* cited by examiner

*Primary Examiner*—Daniel S. Larkin
*Assistant Examiner*—Rodney Frank
(74) *Attorney, Agent, or Firm*—Bereskin & Parr

(57) ABSTRACT

A air meter calibration testing device for testing temperature compensators, comprises a vortex cooling tube, a cold air chamber, a hot air chamber, a bleed valve, a motorized drive system and a compressed air regulator. The vortex tube converts compressed air from the regulator into distinct cold and hot waste air streams. The cold stream is provided to the cold air chamber and the hot stream is provided to the hot air chamber. The regulator is used to adjust the pressure of the compressed air supplied to the vortex tube and accordingly to adjust the temperature in the cold air chamber. The bleed valve is coupled to the hot air outlet of the vortex tube and is used to adjust the air flow of the hot air stream into the hot chamber and accordingly the temperature in the hot air chamber. The motorized drive system is adapted to provide volumetric input to the temperature compensator by actuating the drive shaft of the temperature compensator to simulate connection to a air meter.

11 Claims, 9 Drawing Sheets

| Reference value of temperature and its tolerance | Error tolerance limits |
|---|---|
| $t_h$: 30 ± 2 °C (86 ± 4 °F) | ±1.0% |
| *$t_m$: 15 ± 2 °C (59 ± 4 °F) | ±1.0% |
| $t_l$: 0 ± 2 °C (32 ± 4 °F) | ±1.0% |

*In lieu of the 15 °C reference value, $t_m$ may be performed at the controlled proven room temperature provided that the $t_m$ test is conducted, or is repeated (as per clause 3.3), with the conversion module attached to a meter body.

FIG.6

| Temperature Difference Across Thermal Tubes | | | | |
|---|---|---|---|---|
| Test Position | Tube Inlet Temperature (°F) | Tube Outlet Temperature (°F) | Tube Inlet-Outlet Delta T (°F) | Error introduced by Test Apparatus as % Volume |
| Upper Left | 33.2 | 33.1 | -0.1 | 0.02 |
| Upper Right | 32.5 | 32.3 | -0.2 | 0.04 |
| Lower Left | 85.3 | 85.2 | -0.1 | 0.02 |
| Lower Right | 85.2 | 85.5 | 0.3 | -0.06 |

FIG. 9A

| Temperature Stability within Thermal Tubes | | | | |
|---|---|---|---|---|
| Position | Temperature Start (°F) | Temperature Stop (°F) | Delta T (°F) | Elapsed Time (hours) |
| Upper Left | 32.6 | 32.8 | 0.2 | 4.5 |
| Upper Right | 32.3 | 32.5 | 0.2 | 4.5 |
| Lower Left | 86.1 | 86.4 | 0.3 | 4.5 |
| Lower Right | 86.4 | 86.6 | 0.2 | 4.5 |

GAS METER CALIBRATION TESTING DEVICE

This Appln is a con't of PCT/CA99/00480 filed May 26, 1998.

FIELD OF THE INVENTION

The present invention relates generally to gas meter calibration equipment, and more particularly to a device for testing a gas meter temperature compensator.

BACKGROUND OF THE INVENTION

To create and maintain a fair and efficient marketplace for the buying and selling of natural gas and most dry clean gases, government agencies routinely conduct verification testing to ensure that gas meters are capable of accurate measurement and to prevent gas meters of inferior quality from entering the marketplace. The approval process requires that gas meters undergo comprehensive testing throughout their measuring ranges and at conditions which simulate the environment in which they are intended to operate. Due to large energy consumptions, the negative impact of an unacceptable gas meter measurement error is high.

In gas meters, particularly those for industrial use are required to measure large volumes of gas for heating or cooling purposes. It is necessary to allow for density changes in the gas being metered, particularly for temperature fluctuations. As the temperature rises and the volume of gas increases, the heating capacity of a given volume of gas is reduced. Since most gases are normally sold to the industrial user on the basis of a price per volume at standard temperatures, which is equivalent to a price per thermal unit of heating capacity of the gas, suitable allowance for temperature fluctuations in the gas volume measuring device should be made.

This can be conveniently accomplished by coupling a temperature compensator to the gas meter upon which the consumer records the volume of gas consumed for automatic temperature compensation. U.S. Pat. No. 3,969,939 to Grzeslo discloses an example temperature compensator that uses a temperature sensing element which contacts the flow of gas being metered. Gas flowing through the associated gas meter causes rotation of the impellers of the gas meter which drives a shaft that acts as a driving element which initially converts the dynamic movement of the impellers to an uncorrected volume of gas flow. Also, the temperature sensing element adjusts the position of a cam which affects the travel of a cam striker element to provide temperature correction within the device.

Typically, it is necessary to conduct periodical calibration testing of temperature compensators, in order to ensure accurate operation over the lifetime of the device. Due to the appreciable cost of a undetected measurement error, temperature compensators must be carefully tested. Specifically, the temperature sensing elements of temperature compensators are subjected to predetermined temperature test points, each with an extremely small margin of error. Accordingly, it is necessary to utilize testing equipment which can provide certain temperature test points with a high degree of stability and accuracy.

One conventional temperature compensator testing device uses refrigerated and heated antifreeze baths to provide the necessary temperature test points. This testing device typically requires the temperature sensing elements (and accordingly the temperature compensator) to be positioned in a vertical static orientation. Since temperature compensating devices are conventionally positioned horizontally during operation, generated test results may not reflect true operating conditions. In fact, Canadian government compliance testing protocols currently demand either horizontal or vertical dynamic testing which is difficult to comply with using this type of testing method. Since this method requires the installation of two or three liquid calibration baths, as well as supporting electrical and hardware parts (e.g. refrigerant/ heater portions and motor drive), the testing device is relatively expensive, cumbersome, complicated in design and requires a significant amount of electricity for operation. Due to the poisonous nature of the test fluid and high operational power requirements, this method is also environmentally detrimental. The liquid calibration baths require frequent calibration and are generally not able to provide accurate temperature settings (e.g. typically ±0.1° F. changes throughout the liquid baths) or rapid temperature stability.

Another conventional testing device uses an environment gas chamber with associated circulating fans, duct work and mechanical drive system. While this device provides for horizontal testing, it also has several significant disadvantages. First, due to its cumbersome components, it is relatively expensive, heavy, cumbersome and complicated in design and requires large amounts of energy for operation. This device is not capable of maintaining accurate temperatures (e.g. ±0.1 ° F. changes throughout the system) and it is difficult to obtain rapid temperature stability. Finally, the compressors and refrigerant levels must be frequently monitored, maintained and calibrated for proper operation. Finally, moisture problems tend to develop within the system due to the entry of unfiltered air.

Accordingly, there is a need for an improved gas meter calibration device which provides accurate, rapid and stable temperature test points, which allows for the temperature compensator to be tested in its natural horizontal position, which is simple to operate, environmentally clean and which is compact, light in weight, durable and relatively inexpensive to manufacture.

BRIEF SUMMARY OF THE INVENTION

The present invention provides a gas meter calibration testing device for providing first and second temperature test points for testing a fluid flow meter temperature compensator having a temperature sensitive element and a driving shaft wherein said temperature sensitive element is sequentially subjected to said first and second temperature test points, said testing device comprising:

(a) a vortex cooling tube having an input port for receiving compressed gas, a cold gas port for dispensing a cold gas stream and a hot gas port for dispensing a hot gas stream;

(b) a cold gas chamber coupled to said cold gas port, said cold gas chamber having a body and an insulative layer disposed along a substantial portion of said body to maintain the temperature of the cold gas stream substantially constant within said cold gas chamber such that said cold gas chamber provides the first temperature test point; and (c) a hot gas chamber coupled to said hot gas port, said hot gas chamber having a body and an insulative layer disposed along a substantial portion of said body to maintain the temperature of the hot gas stream substantially constant within said hot gas chamber such that said hot gas chamber provides the second temperature test point.

The present invention also provides a method of calibrating a fluid flow meter temperature compensator of a gas meter, said method comprising the steps of:

(a) supplying a stream of compressed gas to a vortex cooling tube to generate a cold gas stream and a hot gas stream;

(b) maintaining the cold gas stream at a substantially stable first temperature test point for the temperature compensator;

(c) subjecting the temperature compensator to the first temperature test point;

(d) maintaining the hot gas stream at a substantially stable second temperature test point for the temperature compensator;

(e) subjecting the temperature compensator to the second temperature test point; and (f) monitoring the temperature compensation provided by the temperature compensator during steps (c) and (e).

The above amendments are intended to bring the "Summary of the Invention" into line with the claims, as amended. It is submitted that the amendments are fully supported by the application as filed, and that no new subject matter is being introduced.

BRIEF DESCRIPTION OF THE DRAWINGS

In the accompanying drawings:

FIG. 6 is a table listing typical temperature test points for the testing device of FIG. 1;

FIG. 9A is a table listing typical temperature consistency criteria for the testing device of FIG. 1; and FIG. 9B is a table listing typical temperature consistency criteria for the testing device of FIG. 1.

DETAILED DESCRIPTION OF PREFERRED EMBODIMENTS

Figure 1:
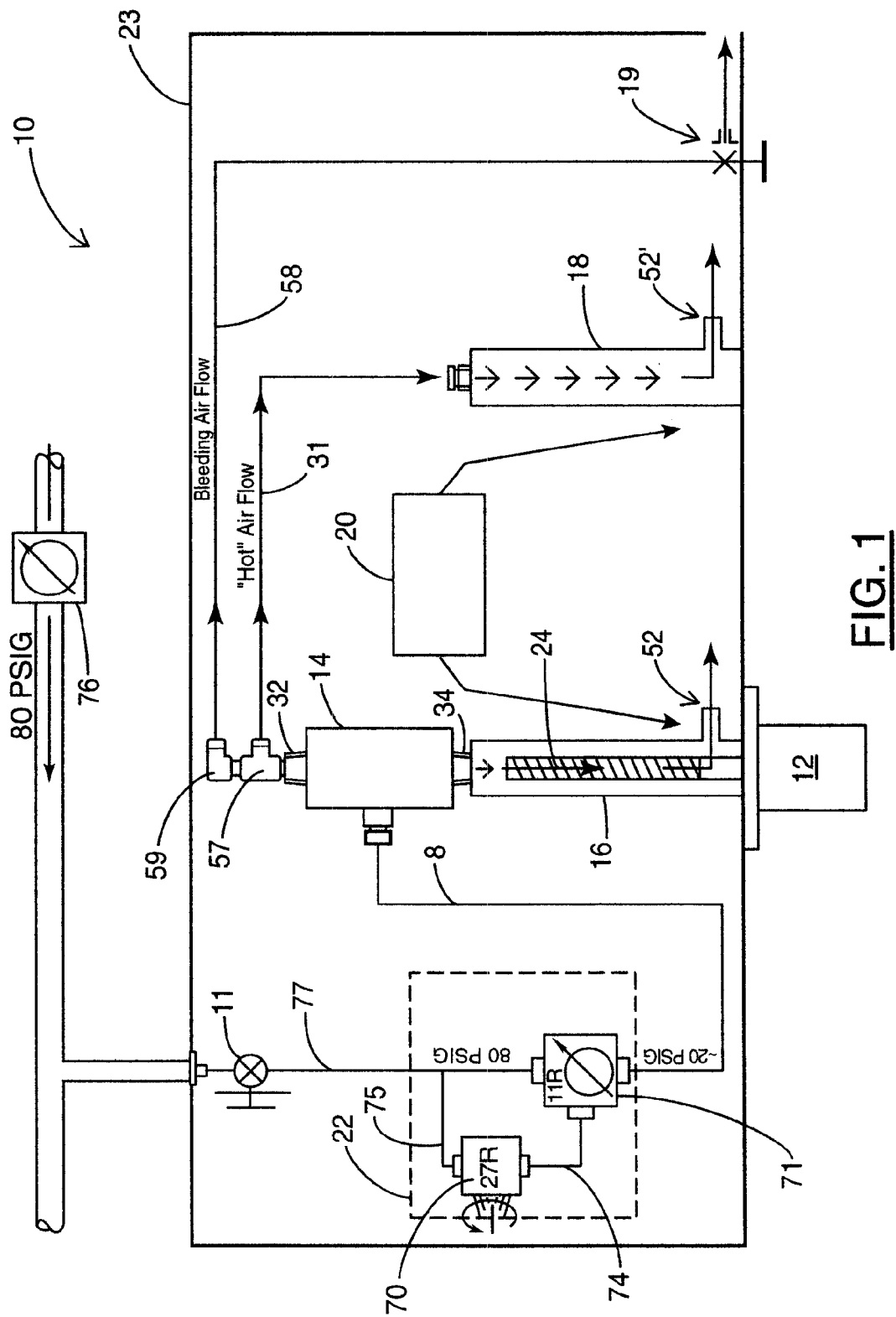
FIG. 1 is a block diagram of the overall configuration of a gas meter calibration testing device according to the present invention.

Reference is first made to FIG. 1 which shows a testing device 10 made in accordance with a preferred embodiment of the invention. Testing device 10 is adapted to provide a number of temperature test points to test the accuracy of operation of a conventionally known temperature compensator 12. Testing device 10 includes a vortex cooling tube 14, a cold air chamber 16, a hot air chamber 18, a bleed valve 19, a motorized drive system 20, and an air flow regulator 22 all contained within housing 23.

Figure 2:
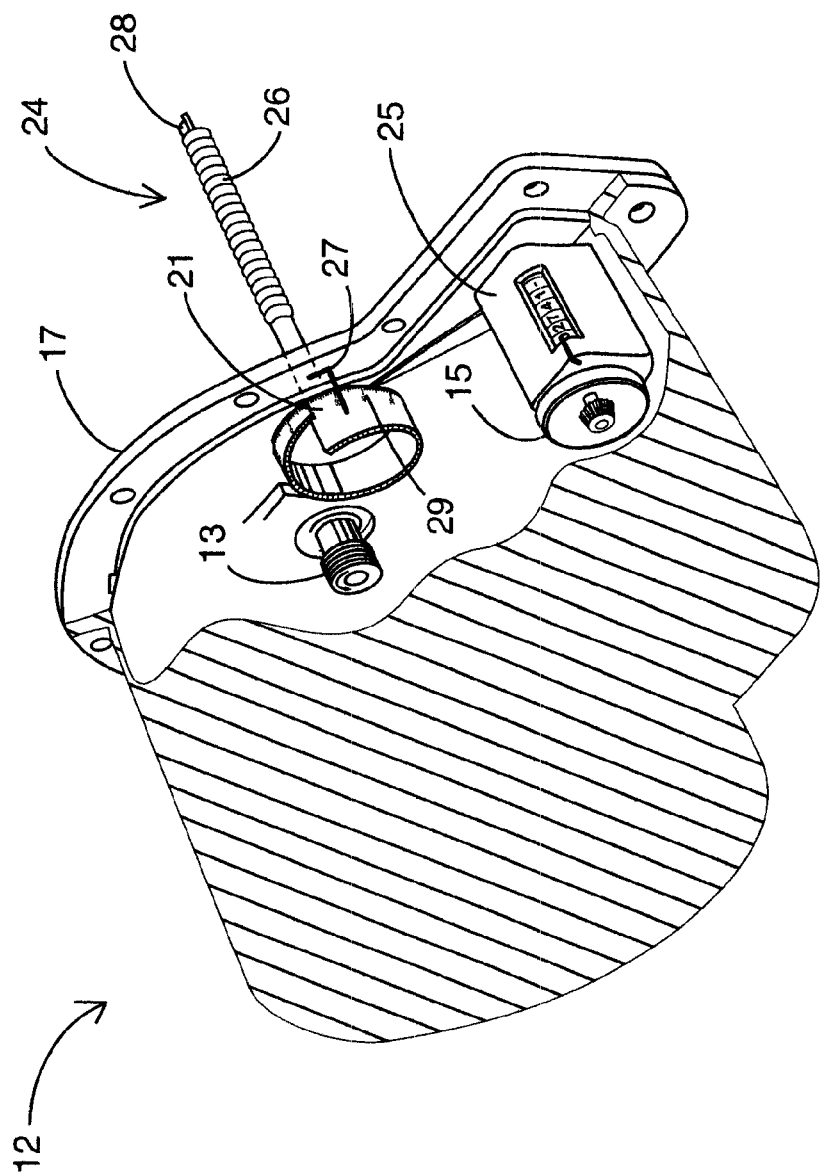
FIG. 2 is a partially cut away view of a conventional temperature compensator which would be tested within the testing device of FIG. 1.

As shown in FIG. 2, a conventional temperature compensator 12 (e.g. the ROMET 2000 TC, 3000 TC, or 5000 TC, manufactured by the applicant and disclosed in U.S. Pat. No. 3,969,939, hereby incorporated by reference) is used in connection with a gas meter (not shown, e.g. ROMET 3000 or 7000, also manufactured by the applicant).

Temperature compensator 12 has a driving shaft 13 that is mechanically actuated by the rotation of the impellers of the gas meter and which in turn drives a gear drive assembly (not shown) in response to the displacement of gas through the gas meter (not shown) which in turn drives the uncorrected volume counter (not shown) and the cam/striker/clutch combination (not shown) which in turn drives the gear wheel 15 on the corrected volume counter 25, as is conventionally known. That is, gas flowing through the associated gas meter causes rotation of the impeller of the gas meter which actuates drive shaft 13 of temperature compensator 12 and which is used by a gear drive assembly to measure actual volume of gas flowing through the meter without regard to the temperature.

Temperature compensator 12 also has a bimetallic temperature sensitive element 24 that consists of a coiled temperature strip 26 mounted on a rod 28. Rod 28 has one end which is designed to be positioned within the gas meter in the path of flow of gas through the gas meter. The other end of rod 28 extends through the mounting plate 17 and carries on its end a cam wheel 21 that bears a visual temperature related scale 29.

A pointer 27 extends from rod 28 to the scale 29 so that as cam wheel 21 rotates in response to temperature changes sensed by the bi-metallic strip 26, pointer 27 indicates the appropriate temperature on scale 29. Also, temperature sensitive element 24 turns as a result of bimetal temperature changes which consequently turns the cam wheel 21 which affects the motion of a cam/striker/clutch combination (not shown) to provide temperature correction of the volume measurement obtained from the gear drive assembly.

Figure 3:
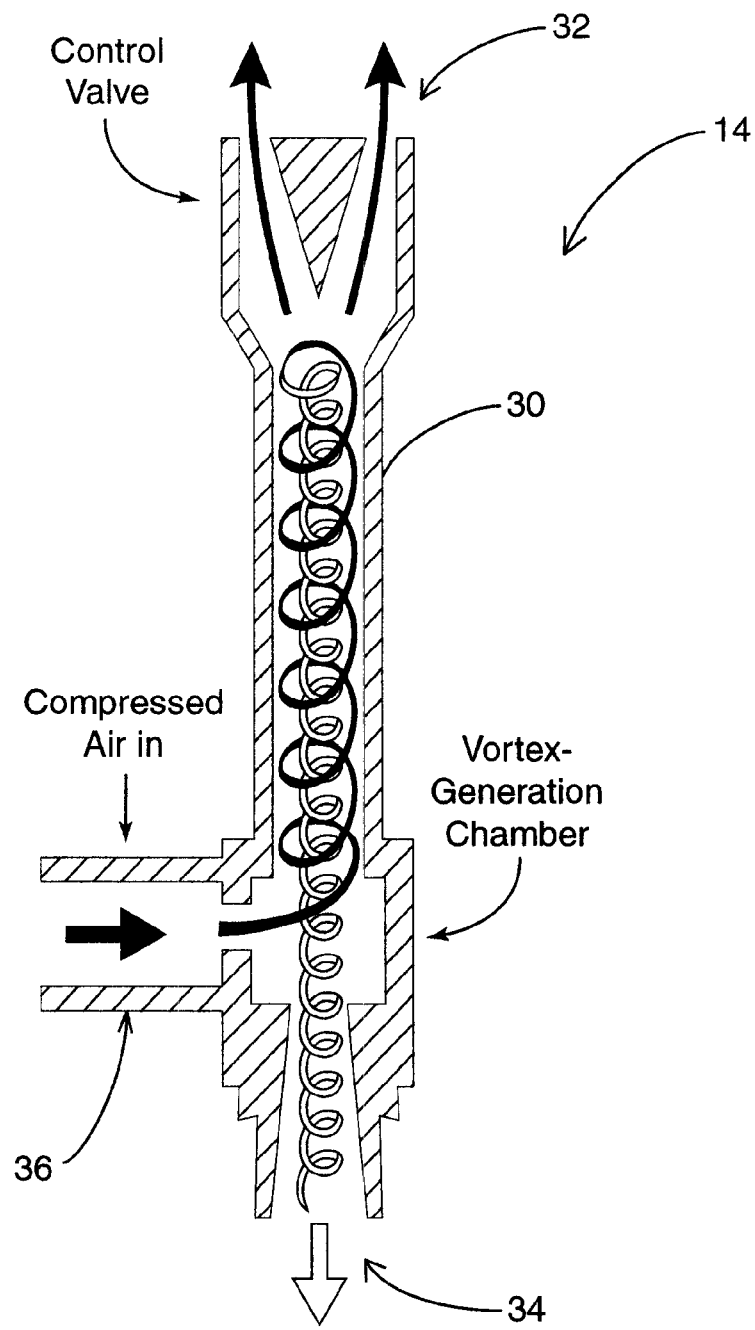
FIG. 3 is a cross sectional view of a conventional vortex cooling tube utilized by the testing device of FIG. 1.

Now referring to FIGS. 1 and 3, and in accordance with the present invention, a conventional counterflow vortex cooling tube 14 (e.g.

VORTEX COOLER™ manufactured by ITWVortec of Ohio) is used within testing device 10 to provide low temperature air to cold air chamber 16 and to provide high temperature air to hot air chamber 18.

Counterflow vortex tubes and their method of operation are well known, such tubes being described, for example, in Fulton U.S. Pat. Nos. 3,173,273 and 3,208,229 and Ranque U.S. Pat. No. 1,952,281. Vortex tube 14 is similar to the vortex tubes disclosed in the aforementioned patents, having a cylindrical generator body 30, a tubular cold air outlet 34 coaxial with the body and projecting from one end thereof, and a tubular hot waste air outlet 32 also coaxial with the body 30. Vortex tube 14 also has a fitting 36 which is adapted to be connected to a source of pressurized air (or other dry gas) and, more particularly, to a line or hose extending from air flow regulator 22 (FIG. 1) which in turn is coupled to a compressor (not shown) or other source of pressurized air.

Reference may be had to the aforementioned patents for details concerning the structure and operation of vortex tube 14. For purposes of fully disclosing the present invention, it is believed sufficient to state that vortex tube 14 operates to divide a stream of compressed air (or other dry gas from any suitable source) entering the body 30 of vortex tube 14 at fitting 36 into cold and hot fractions, the cold fraction being discharged axially from the free end of cold air outlet 34 and the hot fraction being discharged from the free end of hot air outlet 32. It will be understood that the designation "cold" and "hot" refer to the relative values of the temperatures of the two streams. Further it should be understood that any kind of gas could be used within vortex tube 14 and testing device 10 generally.

Compressed air is introduced into the cavity through an appropriate coupling and is caused to swirl producing a vortex having an inner stream and an outer stream. The inner stream gives off kinetic energy in the form of heat to the outer stream and exits vortex tube 14 as cold air through cold air outlet 34 the outer stream exits the opposite end as hot waste air through hot air outlet 32. Vortex tubes can typically produce refrigerated air at temperatures down to −50° F. (−46° C.) using a 100 PSIG (6.9 Bar) compressed air supply. A single control valve in the hot air exhaust can be used to adjust temperature and flow over a wide range.

It will be understood that the primary advantage of vortex tube 14 in the context of the present invention its ability to provide a cold and a hot stream of air or other suitable gas. There are many equally simple and inexpensive devices for providing a hot stream of air or other suitable gas but there is no other device as simple and inexpensive as vortex tube 14 for providing a cold and a hot stream of air or other suitable gas.

It should also be noted that in the usual situation, the cold stream is utilized and the hot waste stream is exhausted to the atmosphere through an appropriate muffler. In contrast, testing device 10 utilizes both cold and hot streams to achieve the temperature testing conditions required for gas meter temperature compensator testing.

Figure 4:
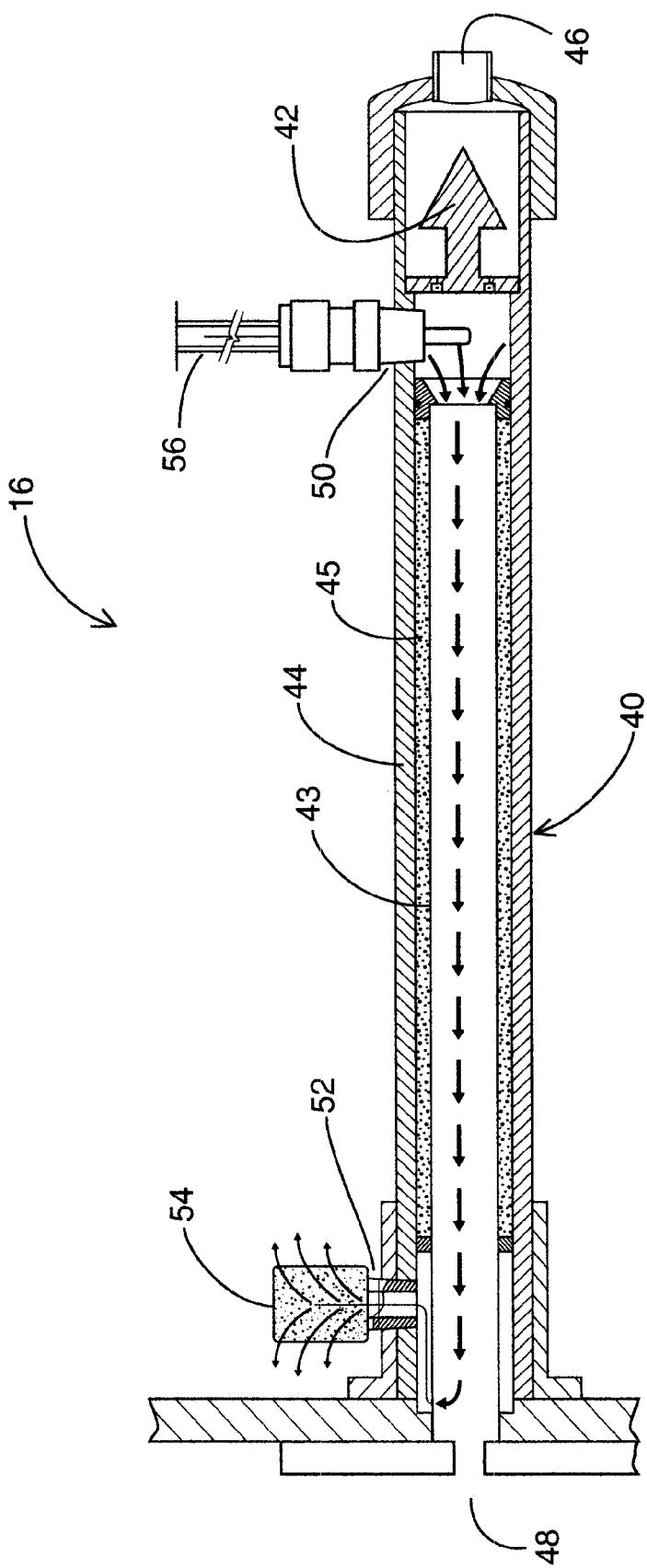
FIG. 4 is a cross sectional view of the cold air chamber of the testing device of FIG. 1.

Referring now to FIGS. 1 and 4, cold and hot air chambers 16 and 18 are each adapted to provide a stable temperature testing environment for the temperature sensitive element 24 of temperature compensator 12. Since cold and hot air chambers 16 and 18 are of identical construction, only the cold air chamber 16 of FIG. 3 will be described. Specifically, cold air chamber 16 includes a body 40 with a number of openings and a inlet deflector 42. It should be noted that both cold and hot air chambers 16 and 18 are oriented in a horizontal position. As discussed previously, it is desirable to test temperature compensator 12 in a horizontal position so that test results reflect true operating conditions.

Body 40 comprises a thin polished metal inner tube 43 (e.g. stainless steel, etc.) separated from an outer resilient housing 44 (e.g. made from PVC, etc.) by an insulative layer 45 (e.g. an air chamber). Sealing materials (e.g. Teflon and Buna) are used to seal all surface edges. Body 40 includes a cold air inlet 46 coupled to the cold air outlet 34 of vortex tube 14, a testing input 48 adapted to receive temperature sensitive element 24 of temperature compensator 12, a measurement outlet 50, and a cold air venting outlet 52.

Inlet deflector 42 is utilized to create turbulence as air passes under pressure from cold air outlet 34 of vortex tube 14 into cold air chamber 16. The turbulence mixes the air within cold air chamber 16 and generates an airflow having a stable temperature within cold air chamber 16. A suitable noise muffler 54 (e.g. open-celled foam, folded screening or open-mesh fabric or any other suitable porous material) is coupled to cold air venting outlet 52 to reduce the noise associated with venting pressurized air. A thermometer probe 56 can be inserted into measurement outlet 50 (as shown) in order to measure the testing temperature of cold air chamber 16.

It should be understood that while it is preferable to use both cold and hot air streams produced by vortex tube 14 to provide cold and hot testing temperatures for temperature compensator 12, it may not be necessary to use both cold and hot air streams for calibration purposes. In such a case, it is contemplated that the air stream provided by one end of the vortex tube 14 could be used to provide one testing temperature with the air stream from the other end being discharged as a waste stream.

Referring back to FIG. 1, an ON/OFF valve 11 is used to provide main line compressed air to air flow regulator 22 to vortex tube 14 through tubing 8. Air flow regulator 22 of sufficient precision is utilized to provide stable and accurate air pressure, which is critical to the proper operation of testing device 10. Regulator 22 is implemented using commercially available regulators 70, 72 (e.g. Parker Model 27R11 and Pilot Regulator #11 R both manufactured by Parker Pneumatic of Michigan) coupled together using tubing 74 and 75 (e.g. ¼ diameter tubing) coupled to a pressure regulator and filter 76 (e.g. Model CB6-03-000, manufactured by Wilkerson) through tubing 77 (¼ diameter plastic tubing). Regulator and filter 76 is adapted to receive a commercially available compressed air supply (e.g. 120 psig compressed air supply) and to provide a lower pressure air supply (e.g. 80 psig) which can then be fed to regulator 22 through tubing 77.

Bleed valve 19 is coupled to hot air outlet 32 through piping 58 and T and L connectors 57 and 59. Bleed valve 19 is preferably a precision needle valve (e.g. Model: SS-IRS4-A, manufactured by Whitey A Swagelok Companies) and is used to provide temperature control of hot air chamber 18 during initial tuning of testing device 10; as will be described. Also, hot air flow is provided to hot air chamber 18 through tubbing 31 and both cold and hot air chambers 16 and 18 have outlets 52 and 52' respectively.

Figure 5:
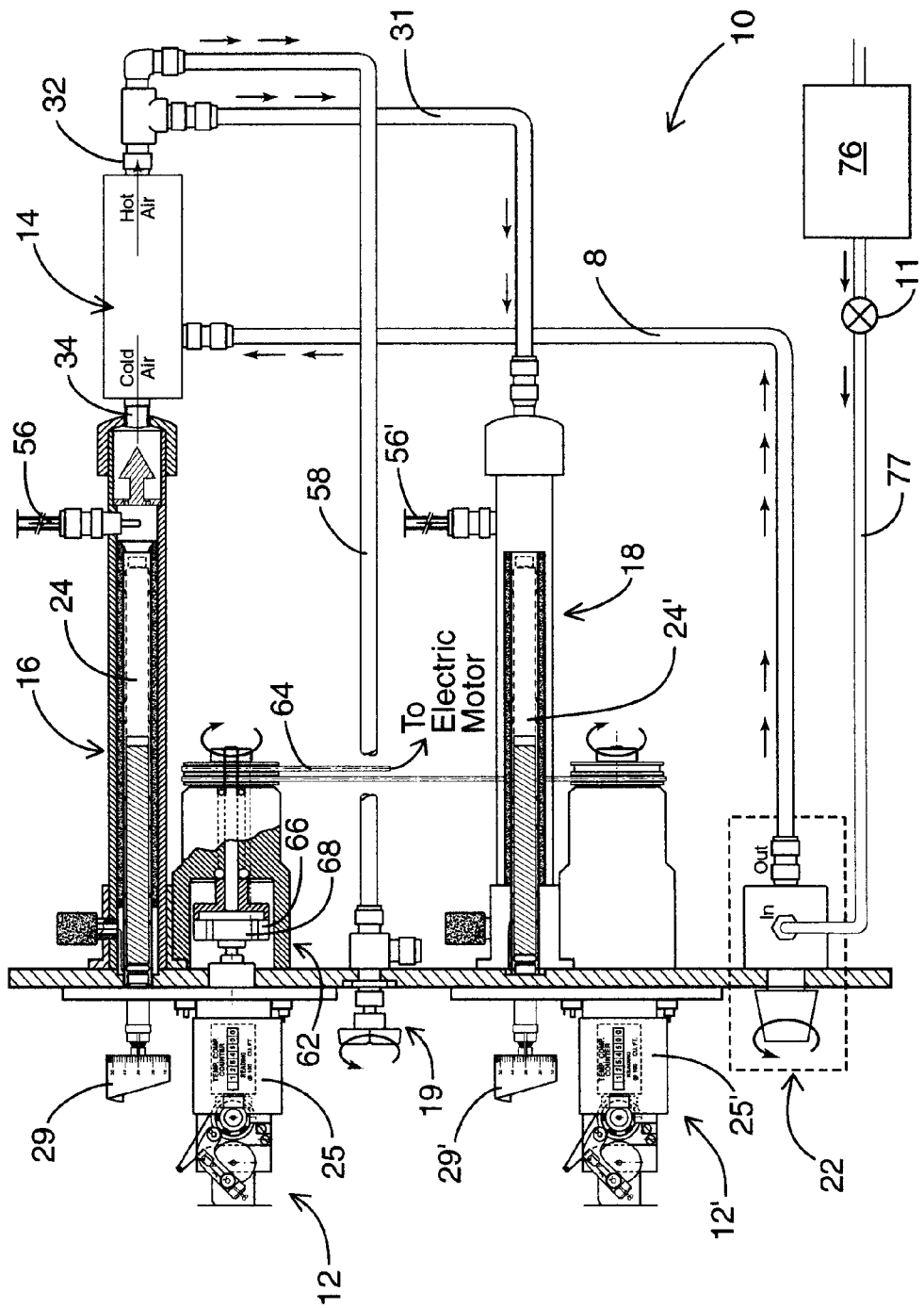
FIG. 5 is a more detailed diagram of the testing device of FIG. 1.

Referring now to FIGS. 1 and 5, testing device 10 is shown in more detail and in association with two temperature compensators 12 and 12'. As shown, motorized drive system 20 is used to provide volumetric input (i.e. to simulate gas meter operation) to the temperature compensator 12, as required by government testing guidelines. The unconverted volume register serves as a reference to verify the temperature converted register of temperature compensator 12. Motorized drive system 20 includes an electric motor (not shown), a magnetic coupled driver 62, and a belt and pulley assembly 64.

The electric motor utilized by motorized drive system 20 is a standard electrical D.C. Motor (Model CM31D17NZ1D, manufactured by Leeson Electric Corp.) and is used to drive the magnetic coupled driver 62 through belt and a conventional pulley assembly 64. The operation of motor 60 is controlled by a potentiometer/variable speed drive (e.g. KB Electronics Model #KVWM-120). Magnetic coupled driver 62 includes an outer magnet drive 66 which encircles the inner magnet and shaft assembly 68 of temperature compensator 12 and which is actuated by motor driven belt and pulley assembly 64. Outer magnet drive 66 is adapted to rotate the inner magnet and shaft assembly 68 of temperature compensator 12, as shown.

As discussed, testing device 10 is shown having two temperature compensator devices 12 and 12' installed for temperature testing within cold air chamber 16 and hot air chamber 18 respectively. Testing device 10 must be initially calibrated in order that desired temperature test points are generated within cold and hot air chambers 16 and 18.

For illustrative purposes, FIG. 6 lists three temperature test points and variance tolerances for a temperature sensitive element 24 which have been adopted by Measurement Canada for inspection testing of mechanical temperature conversion modules (or temperature compensators).

It should also be noted that these testing procedures allow for testing at room temperature in lieu of the middle temperature listed if certain other testing conditions are complied with (as indicated in the table). Accordingly, testing device 10 can be calibrated to generate the high and the low temperatures listed in FIG. 6, namely 0° C. (or 32° F.) and 30° C. (or 86° F.) and accordingly the simple construction of testing device 10 can be utilized for full compliance testing of temperature compensators 12 under the above discussed guidelines.

Referring back to FIGS. 1 and 5, and as previously discussed, vortex tube 14 provides a cold stream of air to cold air chamber 16 though cold air outlet 34 and a hot stream of air to hot air chamber 18 through tubbing 31. As conventionally known, control of the temperature of the hot air stream can be achieved by providing bleeding valve 19 (e.g. coupled to the hot end 32 of vortex tube 14 through tubbing 58) which may be manually adjusted to regulate the proportion of hot air that is provided into hot air chamber 18. It should also be noted that manual adjustment of bleed valve 19 produce changes in flow as well as temperature in hot air chamber 18 and to some degree the temperature in cold air chamber 16, as will be discussed.

In particular, the temperature reduction of the air discharged from cold air outlet 34 of vortex tube 14 varies indirectly with the amount of air flowing therefrom, an adjustment which causes a greater proportion of the compressed air to escape from the cold air outlet 34 (and a lesser proportion from the hot end) would also result in an elevation of the temperature of air discharged at cold air outlet 34 end. However, as conventionally known, the reduction in the cooling effect resulting from an increase in the air temperature is substantially offset by the increased volume of air flowing through cold air outlet 34. It should be noted that some slight variation in the temperature of cold air chamber 16 may result from the variation of bleed valve 19, which may require slight readjustment of main pressure regulator 22.

Accordingly, testing device 10 can be calibrated by first setting the air pressure by suitably adjusting the airflow pressure at regulator 22, such that the desired low temperature is achieved within cold air chamber 16 and then by adjusting bleed valve 19 to provide the desired high temperature within hot air chamber 18 (i.e. to fine tune the temperature provided in hot air chamber 18). As discussed, a relatively constant low temperature is maintained at cold air outlet 34 throughout the manual adjustment of bleed valve 19.

The thermometer probe 56 within cold air chamber 16 should be monitored to see whether variation of the bleed valve 19 has affected the temperature within cold air chamber 16. If so, then regulator 22 should be slightly readjusted to reset the temperature in cold air chamber 16 to the desired low temperature test point. It may also be necessary to adjust bleed valve 19 to reset the temperature in hot air chamber 18 again. It has been determined that once testing device 10 has been tuned to generate the desired temperatures in cold and hot air chambers 16 and 18, little or no operator involvement is necessary, other than insertion and removal of temperature compensator 12 from testing device 10.

Once testing device 10 has been calibrated, temperature compensator 12 can be installed for testing. Specifically, temperature sensing element 24 is alternately inserted into cold and hot air chamber 16 or 18 through housing 23 (to provide the two desired testing temperatures). In each position, the inner magnet and shaft assembly 68 is also inserted within the outer magnet drive 66 through an appropriate orifice in housing 23. As discussed, magnet drive 66 of motorized drive system 20 simulates the presence of a gas meter (i.e. provides volumetric input to temperature compensator 12) and the unconverted volume register serves as a reference to verify the temperature converted register of temperature compensator 12.

Figure 7:
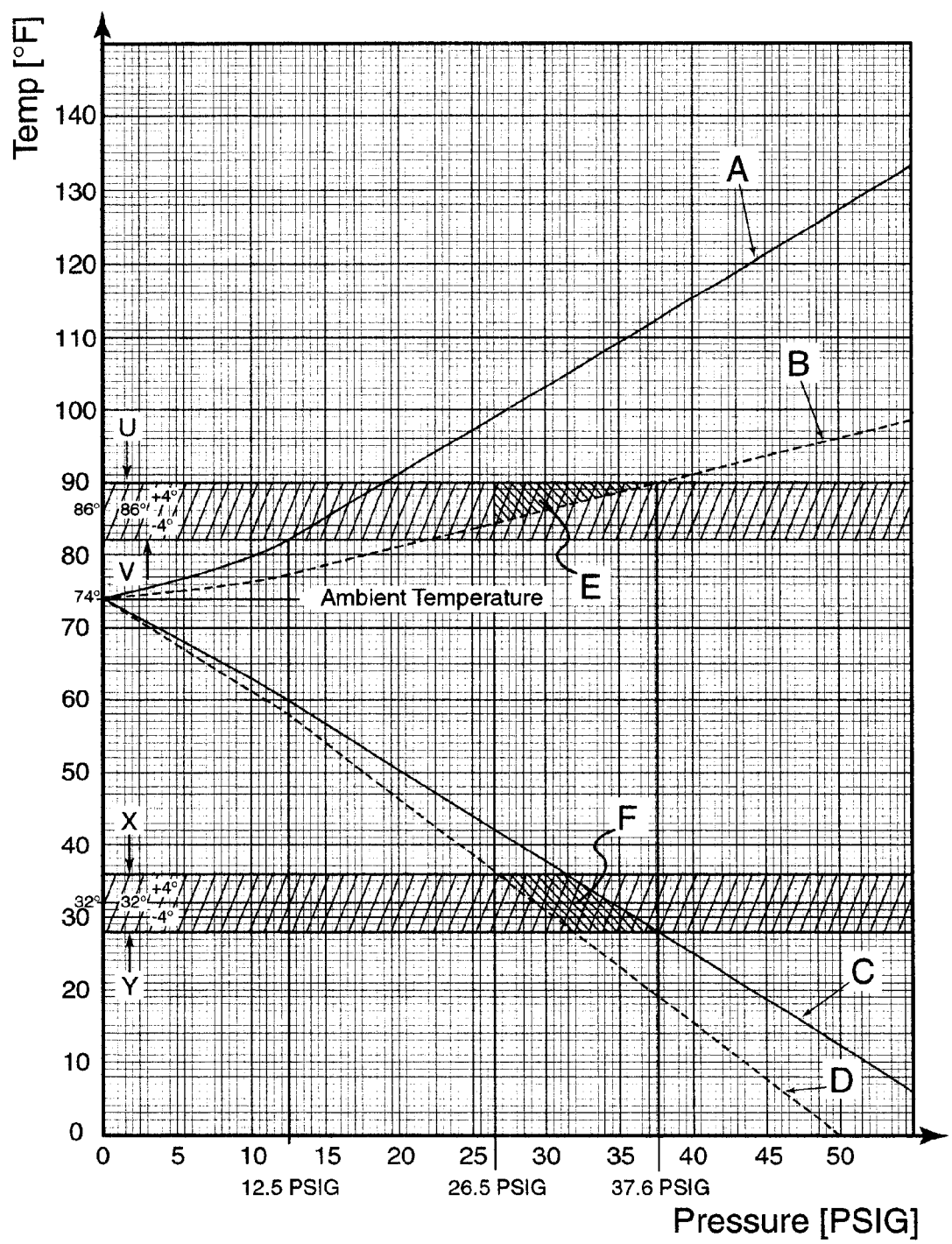
FIG. 7 is a graph showing typical temperature-pressure characteristics for the testing device of FIG. 1.

Referring now to FIGS. 5, 6 and 7, the temperature test points listed in FIG. 6 can be readily achieved within testing device 10 for testing of temperature compensators 12 and 12' (FIG. 5) as indicated in the graph of FIG. 7. The graphical data in FIG. 7 represents the general temperature and pressure characteristics of testing device 10 over a wide range of temperatures and pressures.

Specifically, curve A is the high temperature curve created by vortex tube 14 and curve B is the lowest high temperature value achievable by adjusting regulator 22 and bleed valve 19. Accordingly, test device 10 can achieve the various temperature points that lie between lines A and B for a particular regulator 22 pressure value. It should be noted that horizontal lines U and V represent the allowable Measurement Canada high and low limits, respectively for hot chamber testing (i.e. 82 to 90° F.) as listed in FIG. 6. Accordingly, test device 10 will comply with the high temperature test range (i.e. 82 to 90° F.) if regulator 22 pressure is set within 12.5 to 36.6 psig as shown in FIG. 7.

Correspondingly, curve C is the low temperature curve created by vortex tube 14 and curve D is the lowest low temperature value achievable by adjusting regulator 22 and bleed valve 19. Accordingly, test device 10 can achieve the various temperature points that lie between lines C and D for a particular regulator 22 pressure value. It should be noted that horizontal lines X and Y represent the allowable Measurement Canada high and low limits, respectively for cold chamber testing (i.e. 28 to 36° F.) as listed in FIG. 6. Accordingly, test device 10 will comply with the low temperature test range if regulator 22 pressure is set within 26.5 and 36.6 psig. Both high temperature and low temperature test areas E and F (i.e. 82 to 90° F. (combinations) may be created if regulator 22 pressure is set within 26.5 to 36.6 psig.

Figure 8:
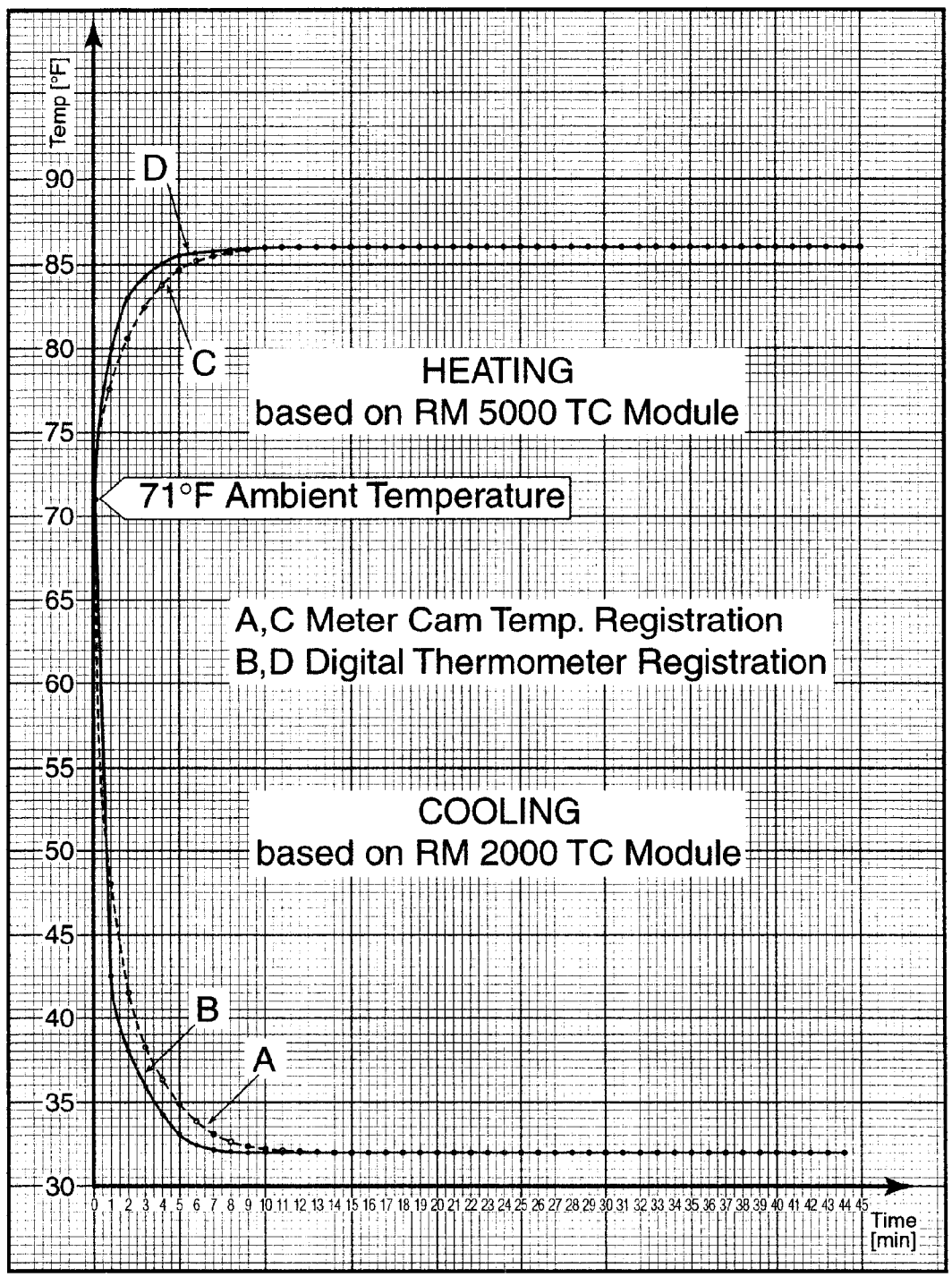
FIG. 8 is a graph showing typical temperature test points over time which can be obtained using the testing device of FIG. 1.

Referring now to FIGS. 5, 8 and 9A and 9B, certain temperature consistency and stability requirements can also be achieved within testing device 10 for testing temperature compensators 12 and 12' (FIG. 5) as indicated in the graph of FIG. 8 and the associated date in FIGS. 9A and 9B. Specifically, for illustrative purposes, the temperature consistency requirement adopted by Measurement Canada is that the actual temperature difference between the inlet (i.e. measured by temperature compensator 12) and the sensing element (i.e. thermometer probe 56) be less than a 0.1% Volume error. Also, the temperature stability requirement adopted by Measurement Canada is that the temperature within each chamber be logged at fixed intervals for a duration of 4.5 hours. While there is no specific quantitative measure for temperature stability at this time, it is contemplated that the temperature within cold and hot air chambers 16 and 18 should remain well within the acceptable temperature ranges listed in FIG. 6.

The graphical data in FIG. 8 represents the performance of testing device 10 when cold air chamber 16 is used to temperature test a ROMET 2000 TC temperature compensator 12 and hot air chamber 18 is used to test a ROMET 5000 TC temperature compensator 12' over a 45 minute period. In respect of temperature consistency, it should be noted that due to the geometry of testing device 10, temperature sensitive element 24 is positioned relatively close to thermometer probe 56 and that the actual temperature difference between the chamber inlet 48 and thermometer probe 56 would be less than the temperature difference between chamber inlet 48 and sensing element.

Specifically, when temperature sensitive element 24 of the ROMET 2000 TC temperature compensator 12 is positioned within cold air chamber 16 (FIG. 5), the temperature curve A is generated within cold air chamber 16 as registered by temperature related scale 29 of temperature compensator 12. The temperature curve B represents the temperature within cold air chamber 16 as measured by thermometer probe 56.

In terms of the temperature difference across cold air chambers 18, testing device 10 appears to introduce an extremely modest error once the temperature within cold and hot air chambers 16 and 18 has instantaneously stabilized. The temperature difference across two test cold chambers 18 (i.e. "Upper Left" and "Upper Right" in FIG. 9A) represents the difference between curves A (i.e. registered by temperature compensator 12) and B (i.e. registered by thermometer probe 56) after stabilization. The various values are listed for the various cold test chambers in FIG. 7A with a maximum error of 0.02. This value substantially less than the 0.1% error threshold which is deemed acceptable by Measurement Canada, as discussed above.

Also, in respect of temperature stability over time, testing device 10 appears to establish and maintain a specified testing temperature within two cold test chambers 18 (i.e. "Upper Left" and "Upper Right") for a 45 minute period of time as shown in FIG. 9B. Specifically, within approximately 6–7 minutes, temperature testing points of curve B (i.e. as measured by thermometer probe 56) falls extremely close to the temperature testing point of 32° F. (or 0° C.) in complete compliance with the requirements listed in FIG. 6 and for the rest of the testing period remain almost precisely stable at 32° F. (or 0° C.). The temperature registered on scale 29 of temperature compensator 12 is also relatively constant after 8 to 9 minutes at just above 32° F. (or 0° C.). The various values are listed for the various cold test chambers in FIG. 7B with a change in temperature over time (i.e. over 4.5 hours) of 0.2 and 0.3° F. It has been determined that this level of temperature stability easily complies with the stability requirements of Measurement Canada.

Conversely, when temperature sensitive element 24' of the ROMET 5000 TC temperature compensator 12' is positioned within hot air chamber 18 (FIG. 5), the temperature curve C is generated within hot air chamber 18 as registered by temperature related scale 29' of temperature compensator 12'. The temperature curve D represents the temperature within hot air chamber 18 as measured by thermometer 56'.

In terms of the temperature difference across hot air chambers 18, testing device 10 also appears to introduce an extremely modest error once the temperatures in cold and hot air chambers 16 and 18 have instantaneously stabilized. The temperature difference across two test hot chambers 18 (i.e. "Lower Left" and "Lower Right" in FIG. 9A) represents the difference between curves C (i.e. registered by temperature compensator 12') and D (i.e. registered by thermometer probe 56'). The various values are listed for the various test chambers in FIG. 7A with a maximum error range of 0.02. This value is substantially less than the 0.1% error threshold which is deemed acceptable by Measurement Canada, as discussed above.

Also, in respect of temperature stability over time, testing device 10 appears to establish and maintain a specified testing temperature within two hot test chambers 18 (i.e. "Lower Left" and "Lower Right") for a 45 minute period of time as shown in FIG. 9B. Specifically, within approximately 8–9 minutes, temperature testing points of curve D (i.e. as measured by thermometer probe 56') falls extremely close to the temperature testing point of 86° F. (or 30° C.) in complete compliance with the requirements listed in FIG. 6 and for the rest of the testing period remain almost precisely stable at 86° F. (or 30° C.). The temperature registered on scale 29' of temperature compensator 12' is also relatively constant after 10 to 11 minutes at 86° F. (or 30° C.). The various values are listed for the various hot test chambers in FIG. 7B with a change in temperature over time (i.e. over 4.5 hours) of −0.1 and 0.3° F. It has been determined that this level of temperature stability easily complies with the stability requirements of Measurement Canada.

It should be understood that testing device 10 could be used to test the operation of various other types of temperature compensators 12, such as digital temperature compensators or temperature compensators manufactured by entities other than the applicant. Also, it should be understood that other devices could be used to provide cold and hot streams of air or suitable gas in place of vortex tube 14. Further, as discussed previously, it should be noted that any kind of gas could be used within testing device 10. Finally, it should be understood that while testing device 10 has been described in association with temperature compensators for gas meters, testing device 10 could be used in association with any device which requires temperature calibration.

Accordingly, testing device 10 provides instantaneously, accurate and stable temperature test points for testing temperature compensators 12. Also, testing device 10 allows for the temperature compensator to be tested in its natural horizontal position. As previously discussed, this is a desirable feature of testing device 10, since it is advantageous to test temperature compensator 12 in a horizontal position (i.e. in its normal operating position). Testing device 10 is also simple to operate once initial calibration has been achieved. Testing device 10 achieves these benefits through the use of few parts and accordingly durable and relatively inexpensive to manufacture.

As will be apparent to persons skilled in the art, various modifications and adaptations of the structure described above are possible without departure from the present invention, the scope of which is defined in the appended claims.

We claim:

1. A method of calibrating a fluid flow meter temperature compensator of a gas meter, said method comprising the steps of:

(a) supplying a stream of compressed gas to a vortex cooling tube to generate a cold gas stream and a hot gas stream;

(b) adjusting the pressure of the compressed gas such that the temperature of the cold gas stream reaches a desired first temperature test point and whereupon the temperature of the hot gas stream is established at a second temperature test point;

(c) bleeding a portion of the hot gas stream from the hot gas port through a bleed valve to fine tune the temperature of the hot gas stream such that it reaches a desired second temperature test point;

(d) maintaining the temperature of the cold gas stream within a temperature tolerance range having a span of equal to or less than eight degrees Fahrenheit;

(e) subjecting the temperature compensator to the desired first temperature test point;

(f) maintaining the temperature of the hot gas stream within a temperature tolerance range having a span of equal to or less than eight degrees Fahrenheit;

(g) subjecting the temperature compensator to the desired second temperature test point, and (h) monitoring the temperature compensation provided by the temperature compensator during steps (e) and (g).

2. The method of claim 1, wherein steps (b) and (d) further comprise the step of directing said cold gas stream into a cold gas chamber and the hot gas stream into a hot gas chamber.

3. The method of claim 1, wherein step (b) further comprises positioning said temperature compensator within the cold gas stream in a substantially horizontal orientation and step (d) further comprises positioning said temperature compensator within the hot gas stream in a substantially horizontal orientation.

4. The method of claim 1, further comprising providing volumetric input to the temperature compensator simultaneously with one of said first temperature test point and said second temperature test point.

5. The method of claim 1, wherein the pressure of the compressed gas is in the range of 26.5 and 36.6 psig.

6. The method of claim 1, wherein the temperature of said cold gas stream is in the range of 28 to 36 degrees Fahrenheit.

7. The method of claim 1, wherein the temperature of said hot gas stream is in the range of 82 to 90 degrees Fahrenheit.

8. The method of claim 1, wherein the temperature of the cold gas stream is maintained within a temperature tolerance range of 0.2 degrees Fahrenheit.

9. The method of claim 1, wherein the temperature of the hot gas stream is maintained within a temperature tolerance range of 0.2 degrees Fahrenheit.

10. The method of claim 1, wherein after steps (b) and (c) are completed, further comprising the step of readjusting the pressure of the compressed gas to return the temperature of the cold gas stream back to the desired first temperature test point.

11. The method of claim 10, after steps (b) and (c) and readjusting the pressure of the compressed gas, further comprising the step of bleeding another portion of the hot gas stream to return the temperature of the hot gas stream back to the desired second temperature test point.

* * * * *